United States Patent
Westerman et al.

(10) Patent No.: US 9,367,167 B2
(45) Date of Patent: *Jun. 14, 2016

(54) BOTTOM-UP WATERSHED DATAFLOW METHOD AND REGION-SPECIFIC SEGMENTATION BASED ON HISTORIC DATA TO IDENTIFY PATCHES ON A TOUCH SENSOR PANEL

(75) Inventors: Wayne Carl Westerman, Burlingame, CA (US); Joshua A. Strickon, Miami, FL (US)

(73) Assignee: Apple Inc., Cupertino, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 13/072,618

(22) Filed: Mar. 25, 2011

(65) Prior Publication Data

US 2011/0175837 A1  Jul. 21, 2011

Related U.S. Application Data

(63) Continuation of application No. 11/818,475, filed on Jun. 13, 2007, now Pat. No. 7,916,126.

(51) Int. Cl.
*G06F 3/041* (2006.01)
*G06F 3/038* (2013.01)
(Continued)

(52) U.S. Cl.
CPC ............. *G06F 3/0416* (2013.01); *G06F 3/038* (2013.01); *G06F 3/0488* (2013.01); *G06T 7/0081* (2013.01); *G06T 7/0091* (2013.01)

(58) Field of Classification Search
CPC ..... G06F 3/0418; G06F 3/0416; G06F 3/044; G06F 3/0488; G06F 3/045; G06F 3/038; G06F 3/046; G06F 3/047; G06F 3/03545; G06F 3/0414; G06F 3/03547; G06F 3/041; G06F 2203/04104; G06F 3/0412
USPC ................ 345/156, 173–178; 178/18–20
See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| JP | 06-161661 A | 6/1994 |
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Jason Olson
(74) *Attorney, Agent, or Firm* — Morrison & Foerster LLP (57) ABSTRACT

The application of a watershed algorithm to pixels and their touch values obtained from a scan of a touch sensor panel to determine patches corresponding to images of touch is disclosed. Prior to applying the watershed algorithm, background pixels having little or no touch values can be eliminated. A primary merge algorithm can then merge adjacent patches together when the saddle point between them is shallow as compared to the peak represented by the patches. However, if two candidate patches for merging have a total number of pixels below a certain threshold, these two patches may not be merged under the assumption that the patches might have been caused by different fingertips. Conversely, if two candidate patches for merging have a total number of pixels above a certain threshold, these two patches can be merged under the assumption that the patches were caused by a single thumb or palm.

22 Claims, 6 Drawing Sheets

(51) Int. Cl.
*G06F 3/0488* (2013.01)
*G06T 7/00* (2006.01)

(56) References Cited

U.S. PATENT DOCUMENTS

| | | | |
|---|---|---|---|
| 5,543,591 A * | 8/1996 | Gillespie et al. | 178/18.03 |
| 5,825,352 A * | 10/1998 | Bisset et al. | 345/173 |
| 5,835,079 A * | 11/1998 | Shieh | 345/173 |
| 5,880,411 A | 3/1999 | Gillespie et al. | |
| 6,061,177 A * | 5/2000 | Fujimoto | 359/443 |
| 6,188,391 B1 | 2/2001 | Seely et al. | |
| 6,310,610 B1 | 10/2001 | Beaton et al. | |
| 6,323,846 B1 * | 11/2001 | Westerman et al. | 345/173 |
| 6,330,345 B1 | 12/2001 | Russo et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,254,775 B2 | 8/2007 | Geaghan et al. | |
| 7,663,607 B2 | 2/2010 | Hotelling et al. | |
| 7,916,126 B2 | 3/2011 | Westerman et al. | |
| 8,479,122 B2 | 7/2013 | Hotelling et al. | |
| 2001/0048753 A1 * | 12/2001 | Lee et al. | 382/103 |
| 2003/0063073 A1 * | 4/2003 | Geaghan et al. | 345/173 |
| 2005/0104867 A1 * | 5/2005 | Westerman et al. | 345/173 |
| 2005/0168460 A1 * | 8/2005 | Razdan et al. | 345/419 |
| 2006/0026521 A1 * | 2/2006 | Hotelling et al. | 715/702 |
| 2006/0097991 A1 | 5/2006 | Hotelling et al. | |
| 2006/0197753 A1 | 9/2006 | Hotelling | |
| 2007/0268269 A1 | 11/2007 | Chang et al. | |
| 2008/0309629 A1 | 12/2008 | Westerman et al. | |
| 2011/0169763 A1 | 7/2011 | Westerman et al. | |

OTHER PUBLICATIONS

Non-Final Office Action mailed Jul. 29, 2010, for U.S. Appl. No. 11/818,475, filed Jun. 13, 2007, 11 pages.
Notice of Allowance mailed Jan. 21, 2011, for U.S. Appl. No. 11/818,475, filed Jun. 13, 2007, seven pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," *CHI '92*, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, pp. 1-333.
Non-Final Office Action mailed Feb. 20, 2014, for U.S. Appl. No. 13/072,623, filed Mar. 25, 2011, 13 pages.
Final Office Action mailed Sep. 18, 2014, for U.S. Appl. No. 13/072,623, filed Mar. 25, 2011, 16 pages.
Final Office Action mailed Aug. 5, 2013, for U.S. Appl. No. 13/072,623, filed Mar. 25, 2011, nine pages.
Non-Final Office Action mailed Jan. 18, 2013, for U.S. Appl. No. 13/072,623, filed Mar. 25, 2011, 11 pages.

* cited by examiner

BOTTOM-UP WATERSHED DATAFLOW METHOD AND REGION-SPECIFIC SEGMENTATION BASED ON HISTORIC DATA TO IDENTIFY PATCHES ON A TOUCH SENSOR PANEL

CROSS-REFERENCE TO RELATED APPLICATIONS

This application is a continuation of U.S. patent application Ser. No. 11/818,475, filed Jun. 13, 2007, which is incorporated herein by reference in its entirety for all purposes.

FIELD OF THE INVENTION

This relates to touch sensor panels used as input devices for computing systems, and more particularly, to techniques for identifying touch patches from images of touch and processing the identified touch patches to obtain more accurate touch patches.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface, and a display device that can be positioned behind the panel so that the touch-sensitive surface can substantially cover the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

However, because users of touch sensor panels can touch the sensor panel using different fingers, hand positions and orientations, and apply these touches with varying degrees of force, it can be difficult to properly interpret the touch events detected on the sensor panel and take appropriate actions.

SUMMARY OF THE INVENTION

This relates to applying a watershed algorithm to pixels and their touch values obtained from a scan of a touch sensor panel to determine patches corresponding to images of touch. Prior to applying the watershed algorithm, background pixels having little or no touch values can be eliminated from consideration, and some amount of smoothing can be performed on the pixels to connect overly segmented patches. After the watershed algorithm has been applied, patches whose pixels are substantially linear (e.g. lie within a single row or column), or patches having a very small number of pixels can be eliminated from consideration as being attributed to noise or other errors.

A primary merge algorithm can then be utilized to merge adjacent patches together when the saddle point between them is shallow as compared to the peak represented by the patches. However, if two candidate patches for merging have a total number of pixels below a certain threshold, these two patches may not be merged under the assumption that the patches might have been caused by different fingertips. Conversely, if two candidate patches for merging have a total number of pixels above a certain threshold, these two patches can be merged under the assumption that the patches were caused by a single thumb or palm. Alternatively or in addition, if two candidate patches for merging were part of a single large patch in a previous panel scan, these two patches can be merged under the assumption that the two patches were generated from the same finger or palm.

Additionally, if a small patch is located substantially directly below a medium-sized patch, this can be indicative of a fingertip and phalange patch, and these two patches can be merged. If a large object such as a face or ear is expected, the merging criteria described above can be made more aggressive under the assumption that the patches were generated from a single large object. Based on the location of the identified patches, hand or finger orientations can be determined, which can be used to further identify which patches can be merged together. Bounding boxes defined around each patch can limit the number of pixels that need to be iteratively considered during post-watershed processing.

Centroids, which define the center point of patches, can be used in post-watershed processing. However, partial patches formed at the edges of the touch sensor panel due to the presence of a finger only partially over the touch sensor panel can lead to inaccurate centroid calculations. To improve the accuracy of centroid calculations for partial patches at the edges of touch sensor panels, a percentage of the pixels in the last column of the patch can be duplicated into an artificial phantom column of pixels that can be used to generate a more accurate centroid location.

BRIEF DESCRIPTION OF THE DRAWINGS

FIG. 2b is a top view of the exemplary symbolic three-dimensional image of touch shown in FIG. 2a, including the four exemplary paths traced in FIG. 2a.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to applying a watershed algorithm to pixels and their touch values obtained from a scan of a touch sensor panel to determine patches corresponding to images of touch. Prior to applying the watershed algorithm, background pixels having little or no touch values can be eliminated from consideration, and some amount of smoothing can be performed on the pixels to connect overly segmented patches. After the watershed algorithm has been applied, patches whose pixels are substantially linear (e.g. lie within a single row or column), or patches having a very small number of pixels can be eliminated from consideration as being attributed to noise or other errors.

A primary merge algorithm can then be utilized to merge adjacent patches together when the saddle point between them is shallow as compared to the peak represented by the patches. However, if two candidate patches for merging have a total number of pixels below a certain threshold, these two patches may not be merged under the assumption that the patches might have been caused by different fingertips. Conversely, if two candidate patches for merging have a total number of pixels above a certain threshold, these two patches can be merged under the assumption that the patches were caused by a single thumb or palm. Alternatively or in addition, if two candidate patches for merging were part of a single large patch in a previous panel scan, these two patches can be merged under the assumption that the two patches were generated from the same finger or palm.

Additionally, if a small patch is located substantially directly below a medium-sized patch, this can be indicative of a fingertip and phalange patch, and these two patches can be merged. If a large object such as a face or ear is expected, the merging criteria described above can be made more aggressive under the assumption that the patches were generated from a single large object. Based on the location of the identified patches, hand or finger orientations can be determined, which can be used to further identify which patches can be merged together. Bounding boxes defined around each patch can limit the number of pixels that need to be iteratively considered during post-watershed processing.

Centroids, which define the center point of patches, can be used in post-watershed processing. However, partial patches formed at the edges of the touch sensor panel due to the presence of a finger only partially over the touch sensor panel can lead to inaccurate centroid calculations. To improve the accuracy of centroid calculations for partial patches at the edges of touch sensor panels, a percentage of the pixels in the last column of the patch can be duplicated into an artificial phantom column of pixels that can be used to generate a more accurate centroid location.

Although some embodiments of this invention may be described generally herein in terms of touch sensor panels, it should be understood that embodiments of the invention can be applicable to both touchscreens and touch tablets (touch sensor panels without a display device). Furthermore, although the touch sensors in the touch sensor panel may be described herein in terms of an orthogonal array of touch sensors having rows and columns, it should be understood that embodiments of this invention are not limited to orthogonal arrays, but can be generally applicable to touch sensors arranged in any number of dimensions and orientations, including diagonal, concentric circle, and three-dimensional and random orientations.

Figure 1:
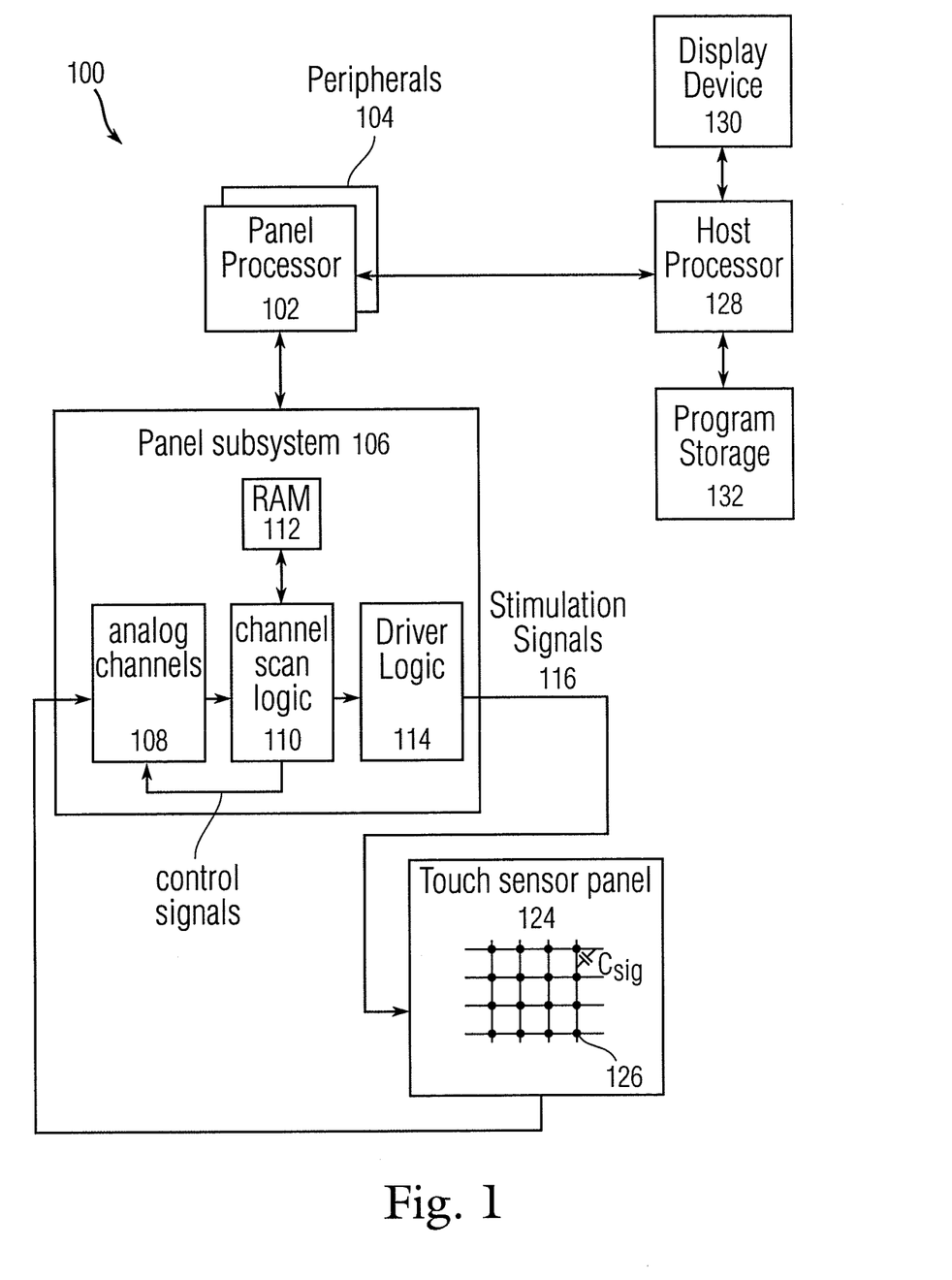
FIG. 1 illustrates an exemplary computing system implementing pre-watershed processing, the watershed algorithm, and post-watershed processing according to one embodiment of this invention.

FIG. 1 illustrates exemplary computing system 100 implementing pre-watershed processing, the watershed algorithm, and post-watershed processing according to embodiments of the invention. Computing system 100 can include one or more panel processors 102 and peripherals 104, and panel subsystem 106. One or more panel processors 102 can include, for example, ARM968 processors or other processors with similar functionality and capabilities. However, in other embodiments, the panel processor functionality can be implemented instead by dedicated logic, such as a state machine. One or more panel processors 102 or host processor 128 can execute software or firmware implementing the algorithm for distinguishing sloppy taps from sliding motions according to embodiments of the invention. Peripherals 104 can include, but are not limited to, random access memory (RAM) or other types of memory or storage, watchdog timers and the like. Panel subsystem 106 can include, but is not limited to, one or more analog channels 108, channel scan logic 110 and driver logic 114. Channel scan logic 110 can access RAM 112, autonomously read data from the analog channels and provide control for the analog channels. In addition, channel scan logic 110 can control driver logic 114 to generate stimulation signals 116 at one or more frequencies and phases that can be selectively applied to rows of touch sensor panel 124. In some embodiments, panel subsystem 106, panel processor 102 and peripherals 104 can be integrated into a single application specific integrated circuit (ASIC).

Touch sensor panel 124 can include a capacitive sensing medium having a plurality of row traces or driving lines and a plurality of column traces or sensing lines, although other sensing media can also be used. The row and column traces can be formed from a transparent conductive medium such as Indium Tin Oxide (ITO) or Antimony Tin Oxide (ATO), although other transparent and non-transparent materials such as copper can also be used. In some embodiments, the row and column traces can be perpendicular to each other, although in other embodiments other non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). The rows and columns can be formed on a single side of a substantially transparent substrate separated by a substantially transparent dielectric material, on opposite sides of the substrate, or on two separate substrates separated by the dielectric material.

At the "intersections" of the traces, where the traces pass above and below (cross) each other (but do not make direct electrical contact with each other), the traces can essentially form two electrodes (although more than two traces could intersect as well) representing a capacitive sensor. Each capacitive sensor can be viewed as picture element (pixel) 126, which can be particularly useful when touch sensor panel 124 is viewed as capturing an "image" of touch over a frame (one complete scan of the panel). (In other words, after panel subsystem 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes appears as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig. Each column of touch sensor panel 124 can drive one or more analog channels 108 (also referred to herein as an event detection and demodulation circuit) in panel subsystem 106. Each analog channel 108 can generate a value representative of an amount of touch being sensed at the connected column, which can be indicative of a touch event at one or more pixels along that column. Touch sensor panel 124 can include single-touch or multi-touch sensor panels, the latter of which is described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device.

Figure 2A:
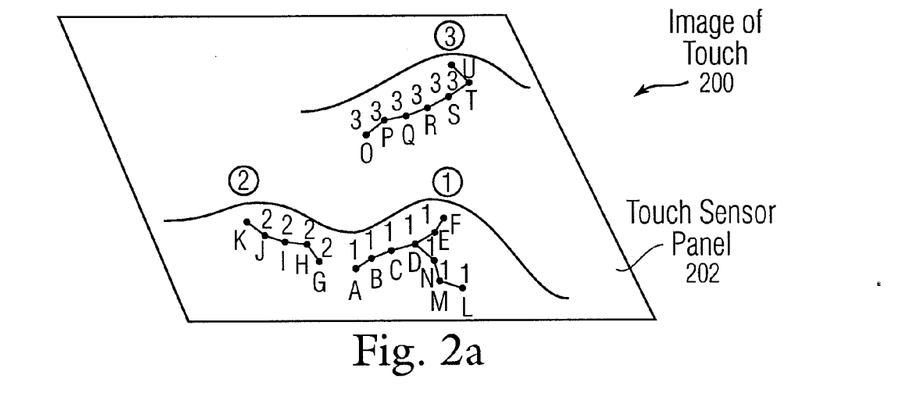
FIG. 2a illustrates an exemplary symbolic three-dimensional image of touch for demonstrating the bottom-up watershed algorithm for identifying touch patches on a touch sensor panel.

FIG. 2a illustrates exemplary symbolic three-dimensional image of touch 200 for demonstrating a bottom-up watershed algorithm for identifying touch patches on touch sensor panel 202. The watershed algorithm (and all other pre- and post-watershed processing described herein) can be software or firmware executed by either the host processor or the panel processor in the computing system of FIG. 1. The raised areas on touch sensor panel 202 can represent an amount of touch (a touch value) sensed at each pixel in the sensor panel (an image of touch). Each pixel can be labeled with a patch or watershed number. Starting from any unlabeled pixel, the watershed algorithm can select a pixel from a group of pixels that can include the unlabeled pixel as the center pixel and one or more neighboring pixels (wherein "neighboring" can be dependent on the arrangement of the pixels), the selection based on the pixel having the largest touch value. If the selected pixel is unlabeled, the original center pixel can be displaced with the selected pixel, which can then be recursively followed to the next neighbor with the largest touch value. The process can continue, the path of pixels being stored for later recollection, until a labeled pixel is selected, at which time all pixels in the path can be labeled with the same label as the selected labeled pixel, or an unlabeled peak is found (a pixel with no neighbors having touch values higher than itself). That peak can labeled with a unique patch or watershed number, and all pixels in the path can be labeled with the same patch number as the newly labeled peak. In some embodiments, the touch value of the peak can be required to exceed a threshold value before the peak will be actually recognized as a peak. After all unlabeled pixels are located, traced, and labeled, all peaks in the image of touch can be identified. Each peak, and all pixels labeled with the same patch number as that peak, can collectively be viewed as a patch. The execution of the watershed algorithm to identify patches from the collected image of touch can be performed after every panel scan.

In the example of FIG. 2a, the algorithm can follow the path identified by points A-F (each point representing a pixel) until an unlabeled peak is found at point F. The pixel at that point can be labeled as patch 1, and all pixels in the path can also be labeled as patch 1. Another unlabeled pixel can be located (see point G), perhaps randomly, and the algorithm can follow the path identified by points G-K until an unlabeled peak is found at point K. The pixel at that point can be labeled as patch 2, and all pixels in the path can also be labeled as patch 2. Another unlabeled pixel can be located (see point L), perhaps randomly, and the algorithm can follow the path identified by points L-N until it joins with a previously labeled pixel at point D (labeled with patch 1), at which time all pixels in the path would be labeled with the same patch as the located labeled pixel (patch 1). Another unlabeled pixel can be located (see point O), perhaps randomly, and the algorithm can follow the path identified by points O-U until an unlabeled peak is found at point U. The pixel at that point can be labeled as patch 3, and all pixels in the path can also be labeled as patch 3.

Figure 2B:
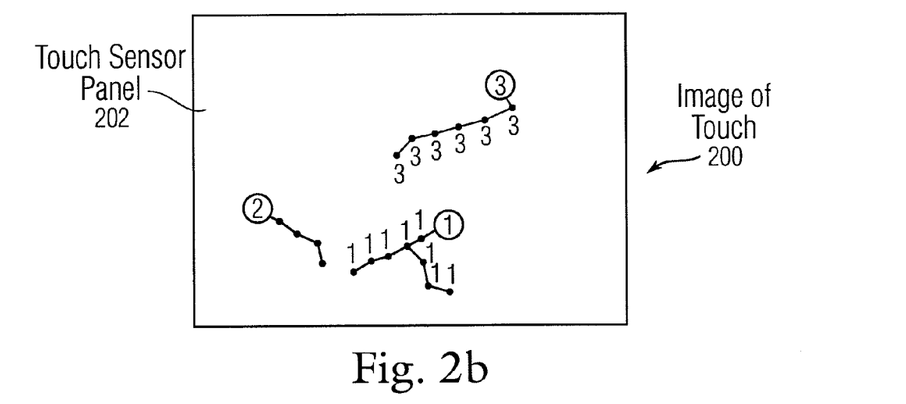

FIG. 2b is a top view of the exemplary symbolic three-dimensional image of touch 200 shown in FIG. 2a, including the four exemplary paths traced in FIG. 2a.

Figure 2C:
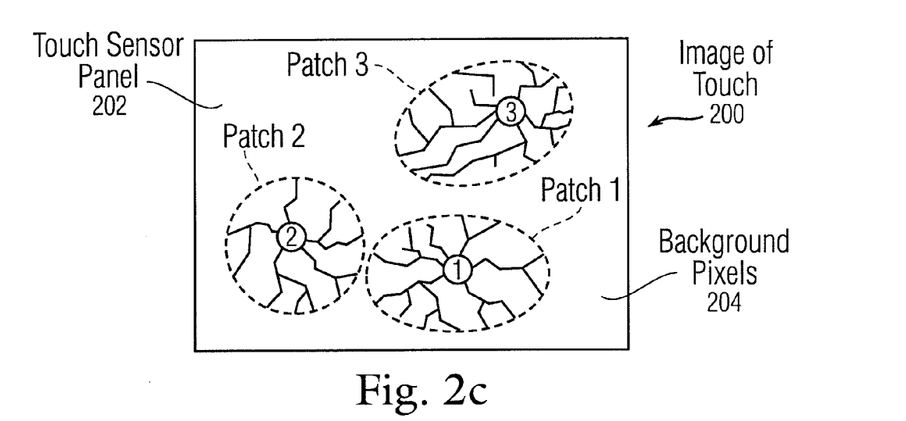
FIG. 2c is a top view of the exemplary symbolic three-dimensional image of touch shown in FIG. 2a, including a number of exemplary traced paths for each patch and background pixels that can be eliminated from consideration according to one embodiment of this invention.

FIG. 2c is a top view of the exemplary symbolic three-dimensional image of touch shown in FIG. 2a, including a number of exemplary traced paths for each patch number. FIG. 2c shows patches 1-3 corresponding to peaks 1-3.

It should be noted that other less computationally intensive methods can also locate the peaks, such as simply identifying the pixels with the highest touch values as the peaks, looking outward from the peaks, and identifying all pixels near the peak with touch values within a certain amount of the peak as the patch for that peak. However, this method can be less accurate in identifying the precise image of touch, because it can be limited to ellipsoidal patches, and can not locate more complex patches such as spiral-shaped patches.

One inaccuracy that can occur with the watershed algorithm described above is that if the current unlabeled pixel is the center of a peak plateau (i.e. its neighbors are also peaks with the same or lesser touch value), a new path and separate patch can get started at each pixel of the plateau instead of including the whole plateau within one patch. In such a case, no other neighbors will exceed and displace the center pixel, even if they have already been marked as peaks and allocated a patch number. To avoid this situation, the algorithm can be modified to allow a number of the neighboring pixels to displace the center pixel if their touch values are greater than or equal to the touch value of the center pixel When faced with a flat peak plateau, this implementation can result in the pixel in the northeast corner of the plateau being designated as the peak. Other pixels will not technically be considered peaks, and can return a neighboring pixel to the north or east until the recursion finds the northeast corner pixel, at which point a new patch can be started. In practice, the ellipsoidal shape of most finger contacts can ensure that touch images are unlikely to contain very large, flat plateaus. Accordingly, the northeast corner pixel that can get marked as a peak is unlikely to be more than a pixel or two away from the geometric plateau center.

The watershed algorithm described above can be a fully recursive procedure, traversing ever higher touch value pixels until a peak is found, then returning back through the same pixel sequence to the starting pixel. However, function call stack space can be in short supply, making deep recursions inappropriate. Therefore, the watershed algorithm according to embodiments of the invention can implement a stack that only stores the coordinates (two words) for each pixel being traversed along a path, rather than a whole function call frame (greater than a dozen words) if it called itself recursively. The path does not terminate until the peak or a previously labeled pixel is reached. After the path is terminated, a marking loop can unroll the coordinates in the stack, and can label each pixel with the patch number of the located peak.

Note that in FIG. 2c, background pixels 204 having no touch value (and therefore were not part of any pixel path during the execution of the watershed algorithm) can represent areas that were not touched surround the patches. In embodiments of the invention, these background pixels 204 can be eliminated from consideration prior to executing the watershed algorithm to improve computational efficiency.

Figure 3A:
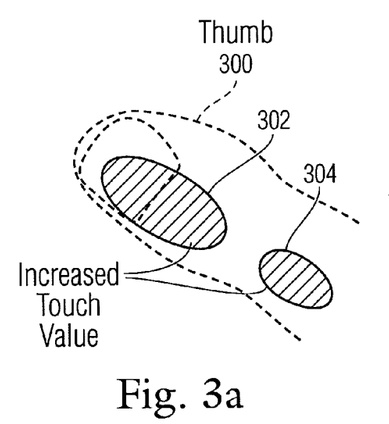
FIG. 3a illustrates an exemplary thumb and two patches generated as a result of over-segmentation of the thumb touching the touch sensor panel.

FIG. 3a illustrates exemplary thumb 300 and two areas of increased touch values 302 and 304 that can be generated as a result of the thumb touching the touch sensor panel, a rolling of the thumb, skin creases, or noise in the topology of the image. Other hand parts such as a palm can also produce similar separated areas of increased touch values.

Figure 3B:
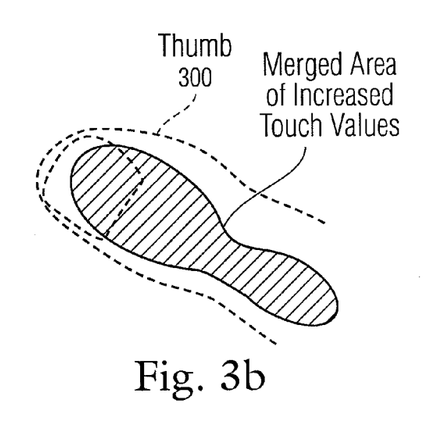
FIG. 3b illustrates the exemplary thumb and the two patches of FIG. 3a merged into a single patch using spatial smoothing according to one embodiment of this invention.

FIG. 3b illustrates exemplary thumb 300 and the two areas of increased touch values of FIG. 3a merged into a single area of increased touch values 306 using spatial smoothing according to embodiments of the invention. Spatially smoothing the touch values (i.e. lowering the peaks and raising the valleys) prior to performing the watershed algorithm can help to connect the areas of increased touch values as shown in FIG. 3b. Smoothing an image prior to application of the watershed algorithm can reduce the number of spurious peaks and prevent over-segmentation and creation of separate patches, especially under palms where the pixel touch values may resemble a noisy plateau. Smoothing in known palm areas is disclosed in U.S. Pat. No. 6,323,846 entitled "Method and Apparatus for Integrating Manual Input," the contents of which are incorporated by reference herein for all purposes.

Centroid interpolation can be impossible for one-dimensional patches, i.e. patches whose pixels all lie within a single row or column, because signals from at least two columns and two rows are needed to interpolate along X and Y axes, respectively. One-dimensional patches can be caused either by isolated noise spikes or by loose connections in a whole row or column electrode, not by significantly proximal fingers. After the watershed algorithm has been performed and patches have been identified, embodiments of the invention can call a "cull" function to remove one-dimensional patches or patches having less than three pixels from a patch list before proceeding to patch merging or patch centroid computations. In addition, isolated single pixels with very high or low values as compared to other neighbors can be excluded as noise.

To track movement of identified patches, maps from two consecutive images can be obtained and compared to see which patches overlap. This can be referred to as patch overlap tracking. In patch overlap tracking, if two patches in consecutive panel scans overlap, it can be assumed that the patches are from the same touch. Previous touch tracking solutions disclosed finding the centroid of patches in frames and associating the closest centroids as being from the same finger. The patches can also be artificially grown to a larger size to assist with tracking higher speed or large movements.

After the watershed algorithm is performed and patches are obtained, embodiments of the invention can perform a post-watershed merge to join patches that were created by the same finger or palm, for example. The following techniques can be independent of hand position estimates or finger identifications, and thus can be utilized in firmware lacking access to operating systems of the dynamic hand model.

Flattened finger joints can produce separate patches, and palms can produce several separate patches. However, the proximity valleys between noise-induced peaks under a single, contiguous hand part are usually not as deep as the proximity valleys from two physically distinct fingers with a flesh crease or real space between them. Therefore, according to one embodiment of the invention, adjoining patches can be merged when the saddle point along their shared border is not very "deep." For example, two adjacent patches can be merged when the saddle magnitude is more than 60-80% of the two patches' peak magnitudes.

Figure 4:
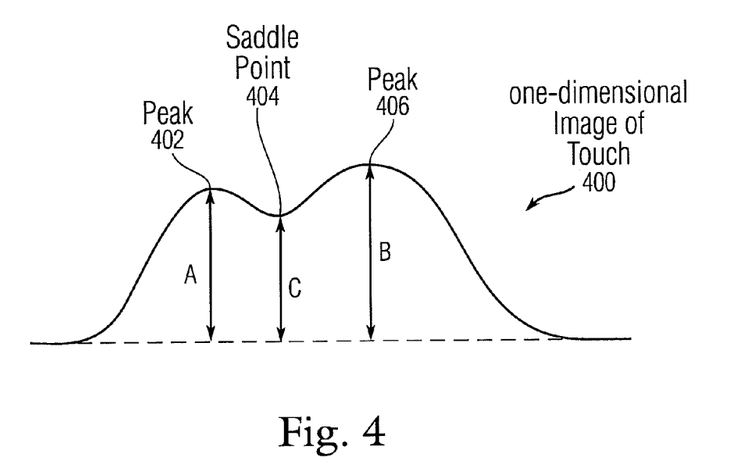
FIG. 4 illustrates an exemplary one-dimensional image of touch in which the two adjacent peaks separated by a saddle point are compared to establish criteria for merging according to one embodiment of this invention.

FIG. 4 illustrates an exemplary one-dimensional image of touch 400 wherein two adjacent peaks 402 and 406 separated by saddle point 404 (the maximum height of the valley between peaks 402 and 406) are compared to compute a peak heights A and B, saddle magnitude C, and establish criteria for merging according to embodiments of the invention. In FIG. 4, heights A, B and C can be obtained from the panel scan, and ratios C/A and C/B can be computed accordingly. If one or both of the ratios are large (e.g. greater than 60-80%), indicating that at least one of the peaks is a small local peak (as compared to the adjacent valley), that local peak can be merged with an adjacent peak.

To identify saddle point 404, it should be understood that mathematically, a saddle point can be defined as a point where a local minimum along one axis coincides with a local maximum along the other axis, and can be the typical topology found between two peaks. Because borders between adjoining watershed regions delineate the valleys (local minima) between peaks, the saddle point can be the maximum of these local minima, i.e. the maximum of the "valley" pixels that straddle patch borders.

Because the border between adjoining patches can be jagged and irregular, there may be no easy way to iterate just the border pixels. However, it is possible to iterate over the entire rectangular bounds (described hereinafter) of both patches, testing the patch map for pixel pairs that straddle the A and B watershed regions. Because the saddle point will almost always lie roughly between the peaks, it is possible to iterate over the rectangle between the two peaks to further narrow the search. It should be noted that the saddle point might not be directly between the patch peaks if the ridge between the peaks is spiral or arc-shaped instead of straight, but in such odd cases the patches can be kept separate instead of merged.

If the primary merge rule were to be applied globally to all patches, it can undesirably merge small fingertips when they are squeezed together. Thus, in another embodiment of the invention, two patches will not be merged if both patches are fingertip-small, i.e. below a predetermined threshold. For example, two patches will not be merged if their combined pixel count is less than 20-22 pixels. This exception can have some dependencies on sensor resolution and fingertip size. For devices with dense (closely spaced) electrode grids, small fingertips can create more pixels per patch and the threshold can be raised accordingly. Although patches for large fingertips can exceed the pixel count threshold, the further separation and deeper valleys between large fingertips can create smaller saddle-peak ratios that lessen the risk for false merger.

In one embodiment of the invention designed primarily for thumbs and palms, two patches can be merged when the combined size of the patches is greater than a predetermined number of pixels (e.g. 30 pixels) and therefore are likely to represent thumb patches. This assumes that patches from two different non-thumb fingers (patches that should not be merged) would most likely have a combined patch size less than the predetermined number of pixels and would not be merged. However, because a heel patch can also be close to the thumb patches, to avoid merging a heel patch, the depth of the valley between the two candidate patches can be used to determine whether merging is proper. For example, if the depth of the valley between two patches is large, it can be assumed that one of the patches is a heel patch, and therefore the two patches should not be merged. In another embodiment, especially useful for thumbs, look at the previous image—if there was a single patch previously, but now there are two, merge the two patches.

A typical thumb patch can be about the same size as two fingertip patches but with only one peak, no valleys and no saddle points. However, the thumb can roll against the sensor grid in such a way that a second peak grows, splitting the thumb patch. Because this is a relatively rare, intermittent occurrence easily corrected by the primary merge rule, a safe way can be provided to bypass the fingertip exception for small patches that have temporarily split from a larger, single patch. Embodiments of the invention can ignore the combined pixel count, i.e. go ahead with primary merging if the pixels for the currently split patches were, in the previous frame's watershed map, all part of a single large patch. In other words, this rule can create merging hysteresis, tending to merge small patches that were already merged in past frames.

In the special case of flattened hands and fingers, a consistent hand-device orientation can be assumed. Phalange joints can cause small patches below the main fingertip patches, and these small patches can begin to show up in touch images as fingers fully flatten. However, the valleys separating the phalange patches from the main fingertip patches can be fairly deep, at least initially. Thus, to merge phalange joints into the main fingertip patches, the saddle-peak ratio threshold must be lowered. Using a phalange-fingertip merge rule according to embodiments of the invention, when a small patch is located substantially directly below a medium-sized patch (presumably the flattened fingertip), the saddle-peak threshold for the primary merge rule can be lowered to 15-25%. Note that the "below a medium-sized patch" aspect can be important. If the saddle-peak threshold were lowered for a patch to the side of a medium-sized patch, undesirable merges of adjacent fingers can occur. Lowering the threshold for a patch above a medium-large patch can encourage merging of the phalange joints into flattened palm patches.

The merging process can require a nested iteration through a list of patches, testing each patch A in the patch list against each of its neighbors B. First, it can be determined whether patch A adjoins patch B (i.e. their bounds are adjacent or overlapping). Next, the fingertip and thumb exceptions described above can be evaluated for applicability. If patches A and B are indicated as candidates for merging, the saddle point between the patches can be identified (see below), and the saddle magnitude criteria for merging according to the primary merge rule can be lowered. For example, two adjacent patches can be merged when the saddle magnitude is only 15-20% of the two patches' peak magnitudes. If the primary merge rule indicates that patches A and B can be merged, they are marked as such, but are not yet actually merged until after all merges have been identified.

In another embodiment, if a large object such as a face is expected, merging can be performed more aggressively (more often). When only fingers are anticipated, merging can be done less aggressively (less often). For example, if a far-field proximity sensor is available, then if the far-field proximity sensor detects a large object such as a face, one or more of the merging criteria described above can be relaxed to allow for more aggressive merging of patches caused by the face.

Figure 5:
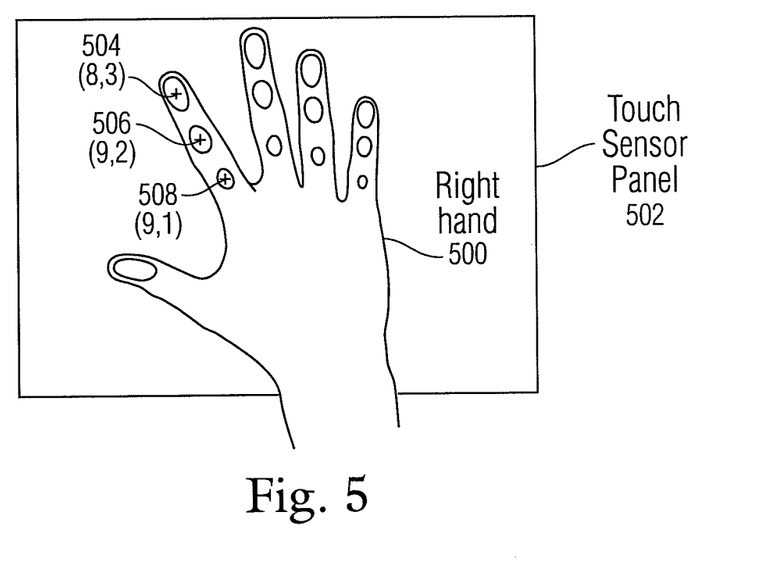
FIG. 5 illustrates exemplary patches caused by a right hand touching a sensor panel and the merging of selected patches according to one embodiment of this invention.

FIG. 5 illustrates exemplary patches caused by a right hand 500 touching sensor panel 502 and the merging of selected patches according to embodiments of the invention. In one embodiment, substantially vertically aligned patches 504, 506 and 508 (e.g. adjacent patches having X-coordinates within a certain narrow range), as determined by their computed centroids, can be merged under the assumption that such patches were caused by the same finger. In this embodiment, hand or finger orientation need not be known. In the example of FIG. 4, index finger patches have simplified coordinates of (8,3), (9,2) and (9,1), and because the X-coordinates are all with one unit of each other, these three patches can be merged.

In another embodiment, hand or finger orientations can be computed based on an estimated source and orientation of one or more patches. For example, the patches (8,3), (9,2) and (9,1) in FIG. 5 can be assumed to be from an index finger (because of the location of the thumb patch), and the angle of the index finger with respect to an axis can be calculated. Alternatively, the orientation of fingers can be estimated from the elongated shape of the patches in a particular direction. Based on this estimated angle, the index finger patches 504, 506 and 508 and other groups of patches can be separately merged as described above. In the example of FIG. 5, if the hand angle is calculated to be 10 degrees past vertical, no groups of substantially horizontally aligned non-thumb patches (e.g. within ±45 degrees of horizontal) can be merged, but groups of substantially vertically aligned non-thumb patches can be merged. In other words, if the orientation of fingers or the hand can be estimated, columns (as opposed to rows) can be merged more aggressively.

In another embodiment, if the patches can be estimated to be from an index finger, merging can be made less likely as compared to patches known to be from a palm, because an index finger may have a middle finger next to it.

Figure 6:
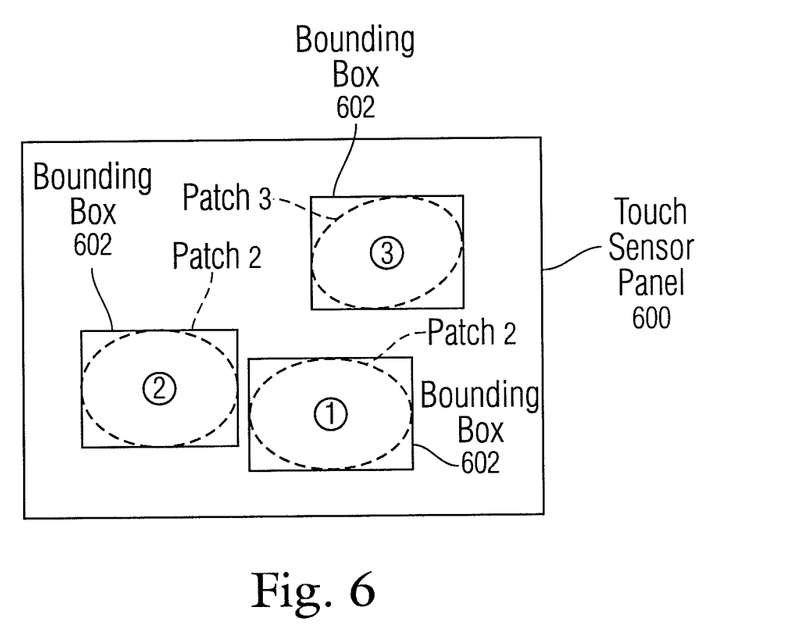
FIG. 6 illustrates exemplary bounding boxes that can be established around each patch to limit the number of iterations in post-watershed merging algorithms according to one embodiment of this invention.

FIG. 6 illustrates an exemplary image of touch in sensor panel 600 with bounding boxes 602 that can be established around each patch to limit the number of iterations in the post-watershed merge algorithms mentioned above, and also that can be used as a quick test for adjacency, according to embodiments of the invention. Once a patch has been started at a peak, the watershed algorithm can expand the patch's bounding box as each pixel is added to the patch. Once the bounding boxes for all patches have been defined, any time an iteration of all of the pixels in a patch is needed, only the pixels in a particular box containing the patch can be iterated. This can be more efficient than iterating over all pixels in the entire sensor panel, which can be mainly background pixels with no recorded image of touch. This can also simplify patch processing into object-oriented functions computing on one patch at a time, and only storing intermediate statistics on one patch at a time, rather than tackling all patches within a whole-image iteration loop, and maintaining intermediate statistics on all patches at once.

Figure 7:
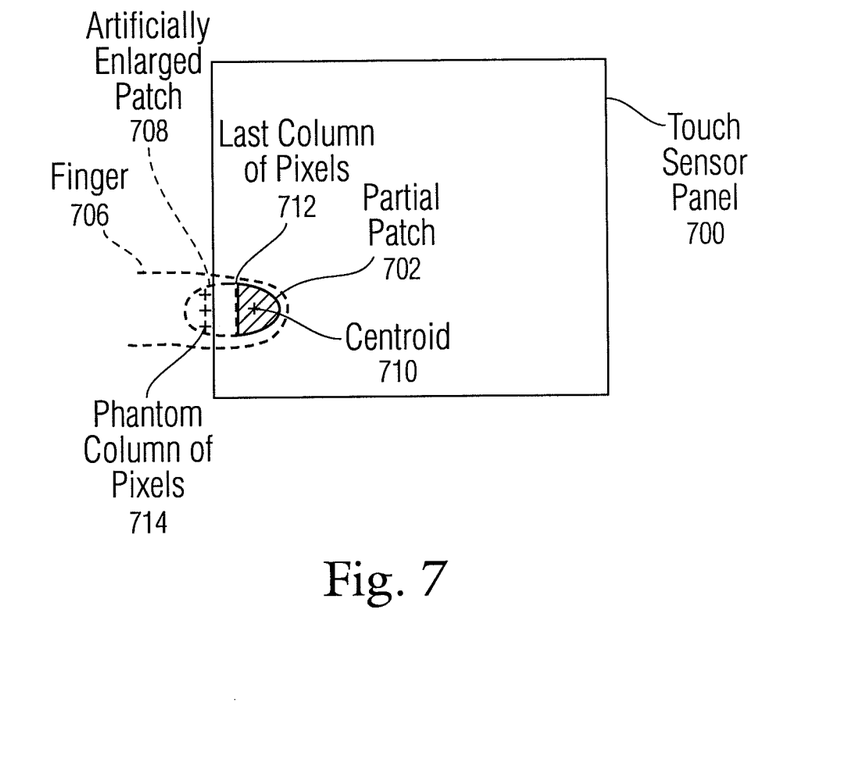
FIG. 7 illustrates an exemplary image of touch at an edge of a touch sensor panel and a methodology for computing a centroid with enhanced accuracy according to one embodiment of this invention.

FIG. 7 illustrates exemplary patch 702 at an edge of touch sensor panel 700 and a methodology for computing a centroid with enhanced accuracy according to embodiments of the invention. As shown in FIG. 7, finger 706 only partially positioned over the panel at the edge of the panel produces partial patch 702. Because the software can improperly interpret partial patch 702 as representing an entire finger image, centroid 710 can be calculated that is closer to the finger tip than it should be. To avoid this, some predetermined percentage (e.g. 25-50%) of the pixels in the last column of pixels 712 on panel 700 for which a touch was detected can be duplicated into a phantom column 714 to generate artificially enlarged patch 708. Artificially enlarged patch 708 can be used to compute a more accurate centroid.

Figure 8A:
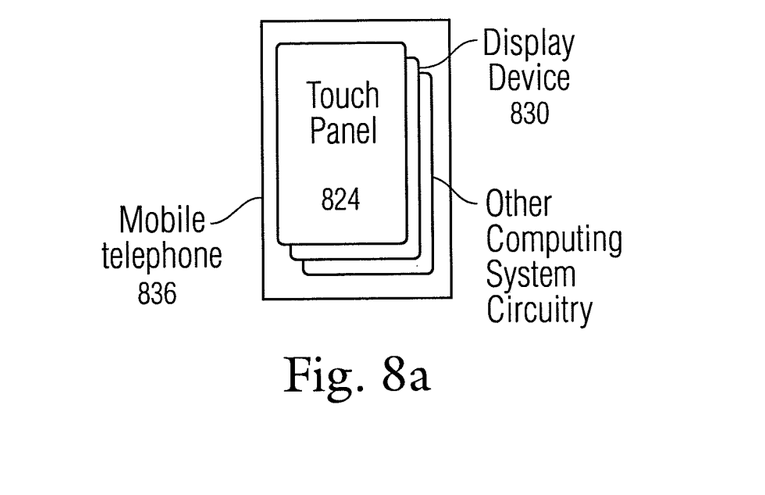
FIG. 8a illustrates an exemplary mobile telephone that can include a touch sensor panel, display device, and other computing system blocks in the computing system of FIG. 1 that can execute the watershed algorithm and post-watershed operations according to one embodiment of this invention.

FIG. 8a illustrates an exemplary mobile telephone 836 that can include touch sensor panel 824, display device 830, and other computing system blocks in computing system 100 of FIG. 1 that can execute the watershed algorithm and post-watershed operations according to embodiments of the invention.

Figure 8B:
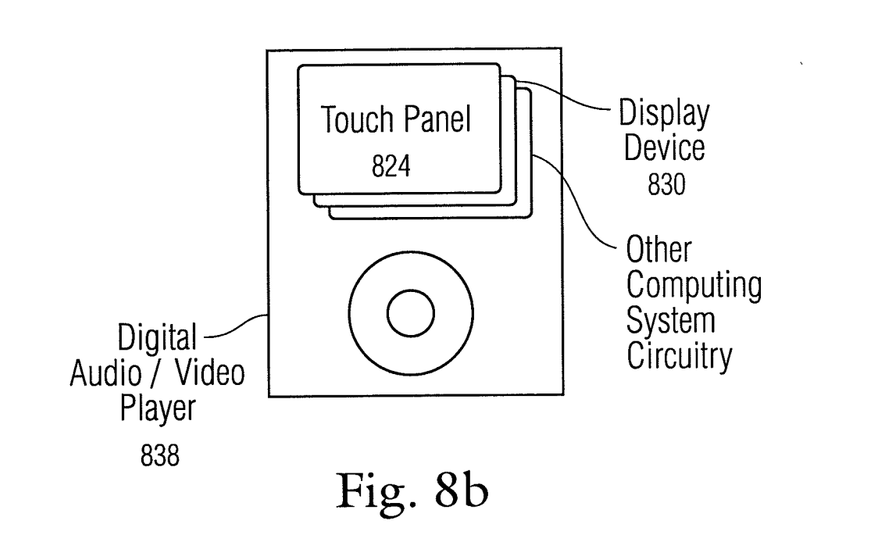
FIG. 8b illustrates an exemplary digital audio/video player that can include a touch sensor panel, display device, and other computing system blocks in the computing system of FIG. 1 that can execute the watershed algorithm and post-watershed operations according to one embodiment of this invention.

FIG. 8b illustrates an exemplary digital audio/video player 838 that can include touch sensor panel 824, display device 830, and other computing system blocks in computing system 100 of FIG. 1 that can execute the watershed algorithm and post-watershed operations according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for identifying touch patches on a touch sensor panel, comprising:
   measuring touch values of touch pixels on the touch sensor panel;
   identifying a touch pixel having a largest touch value as representing a peak;
   associating a plurality of touch pixels in an area surrounding the peak with a patch of touch pixels including the peak; and
   selectively merging two or more non-overlapping patches of touch pixels into a single patch of touch pixels utilizing predetermined merging criteria upon determining that a number of touch pixels in at least one of the two or more touch patches is greater than a predetermined threshold.

2. The method of claim 1, further comprising associating those touch pixels in the area surrounding the peak having touch values within a predetermined amount of the touch value of the peak with the patch of touch pixels including the peak.

3. The method of claim 1, further comprising decreasing the touch values of the touch pixel representing the peak, and increasing the touch values of touch pixels in the areas surrounding the peak having lowest touch values by predetermined amounts, prior to associating the plurality of touch pixels with the patch of touch pixels.

4. The method of claim 1, further comprising deleting patches of touch pixels having less than a predetermined number of touch pixels aligned in a single dimension prior to selectively merging patches of touch pixels.

5. The method of claim 1, further comprising eliminating touch pixels having touch values that are higher than their neighboring touch pixels by a predetermined amount prior to associating the plurality of touch pixels with the patch of touch pixels.

6. The method of claim 1, further comprising deleting patches of touch pixels whose pixels are substantially linear prior to selectively merging patches of touch pixels.

7. The method of claim 1, further comprising disregarding other merging criteria and keeping two patches of touch pixels separate if both patches are below a predetermined size value.

8. The method of claim 1, further comprising merging two patches of touch pixels if a combined size of both patches is above a predetermined size value.

9. A non-transitory computer-readable storage medium storing program code for identifying touch patches on a touch sensor panel, the program code for causing performance of a method comprising:
   identifying a touch pixel on the touch sensor panel having a largest touch value as representing a peak;
   determining a patch of touch pixels for the peak by associating a plurality of touch pixels in an area surrounding the peak with the patch of touch pixels; and
   selectively merging two or more non-overlapping patches of touch pixels into a single patch of touch pixels utilizing predetermined merging criteria upon determining that a number of touch pixels in at least one of the two or more touch patches is greater than a predetermined threshold.

10. The non-transitory computer-readable storage medium of claim 9, the method further comprising associating those touch pixels in the area surrounding the peak having touch values within a predetermined amount of the touch value of the peak with the patch of touch pixels.

11. The non-transitory computer-readable storage medium of claim 9, the method further comprising decreasing the touch value of the touch pixel representing the peak, and increasing the touch values of touch pixels in the areas surrounding the peak having lowest touch values by predetermined amounts, prior to associating the plurality of touch pixels with the patch of touch pixels.

12. The non-transitory computer-readable storage medium of claim 9, the method further comprising deleting patches of touch pixels having less than a predetermined number of touch pixels aligned in a single dimension prior to selectively merging patches of touch pixels.

13. The non-transitory computer-readable storage medium of claim 9, the method further comprising eliminating touch pixels having touch values that are higher than their neighboring touch pixels by a predetermined amount prior to associating the plurality of touch pixels with the patch of touch pixels.

14. The non-transitory computer-readable storage medium of claim 9, the method further comprising deleting patches of touch pixels whose pixels are substantially linear prior to selectively merging patches of touch pixels.

15. The non-transitory computer-readable storage medium of claim 9, the method further comprising disregarding other merging criteria and keeping two patches of touch pixels separate if both patches are below a predetermined size value.

16. The non-transitory computer-readable storage medium of claim 9, the method further comprising merging two patches of touch pixels if a combined size of both patches is above a predetermined size value.

17. A touch-sensitive device comprising the non-transitory computer-readable storage medium of claim 9.

18. A touch-sensitive device, comprising:
  a touch sensor panel including a plurality of touch pixels; and
  a panel processor for identifying touch patches on a touch sensor panel, the panel processor programmed for
    receiving touch values obtained from the touch pixels,
    identifying a touch pixel having a largest touch value as representing a peak,
    associating a plurality of touch pixels in an area surrounding the peak with a patch of touch pixels including the peak, and
    selectively merging two or more non-overlapping patches of touch pixels into a single patch of touch pixels utilizing predetermined merging criteria upon determining that a number of touch pixels in at least one of the two or more touch patches is greater than a predetermined threshold.

19. The touch-sensitive device of claim 18, the panel processor further programmed for decreasing the touch value of the touch pixel representing the peak, and increasing the touch values of touch pixels in the areas surrounding the peak having lowest touch values by predetermined amounts, prior to associating the plurality of touch pixels with the patch of touch pixels.

20. The touch-sensitive device of claim 18, the panel processor further programmed for deleting patches of touch pixels having less than a predetermined number of touch pixels aligned in a single dimension prior to selectively merging patches of touch pixels.

21. The touch-sensitive device of claim 18, the panel processor further programmed for eliminating touch pixels having touch values that are higher than their neighboring touch pixels by a predetermined amount prior to associating the plurality of touch pixels with the patch of touch pixels.

22. The touch-sensitive device of claim 18, the panel processor further programmed for deleting patches of touch pixels whose pixels are substantially linear prior to selectively merging patches of touch pixels.

* * * * *